H. G. HOOVESTOL.
SAW TRUCK.
APPLICATION FILED JAN. 17, 1908.

906,714.

Patented Dec. 15, 1908.

4 SHEETS—SHEET 1.

FIG. 1.

Witnesses
L. B. James
F. G. Smith

Inventor
Harold G. Hoovestol
By Chandler & Chandler
Attorneys

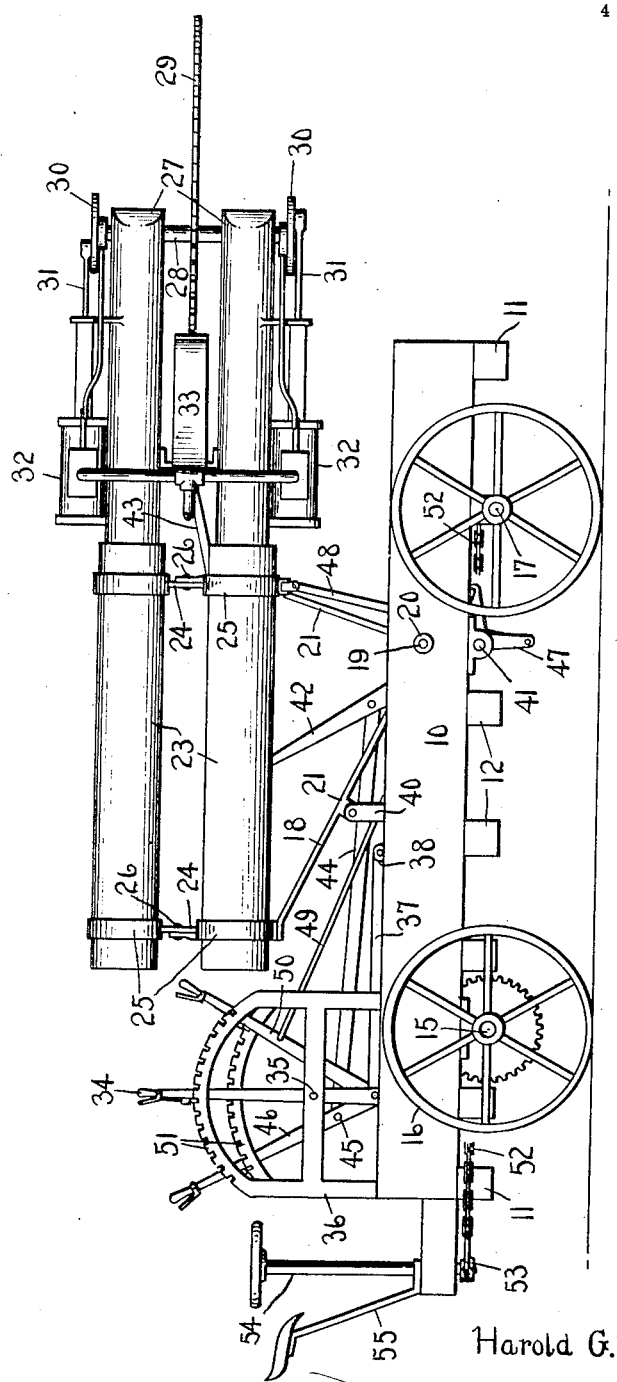

H. G. HOOVESTOL.
SAW TRUCK.
APPLICATION FILED JAN. 17, 1908.
906,714.
Patented Dec. 15, 1908.
4 SHEETS—SHEET 3.
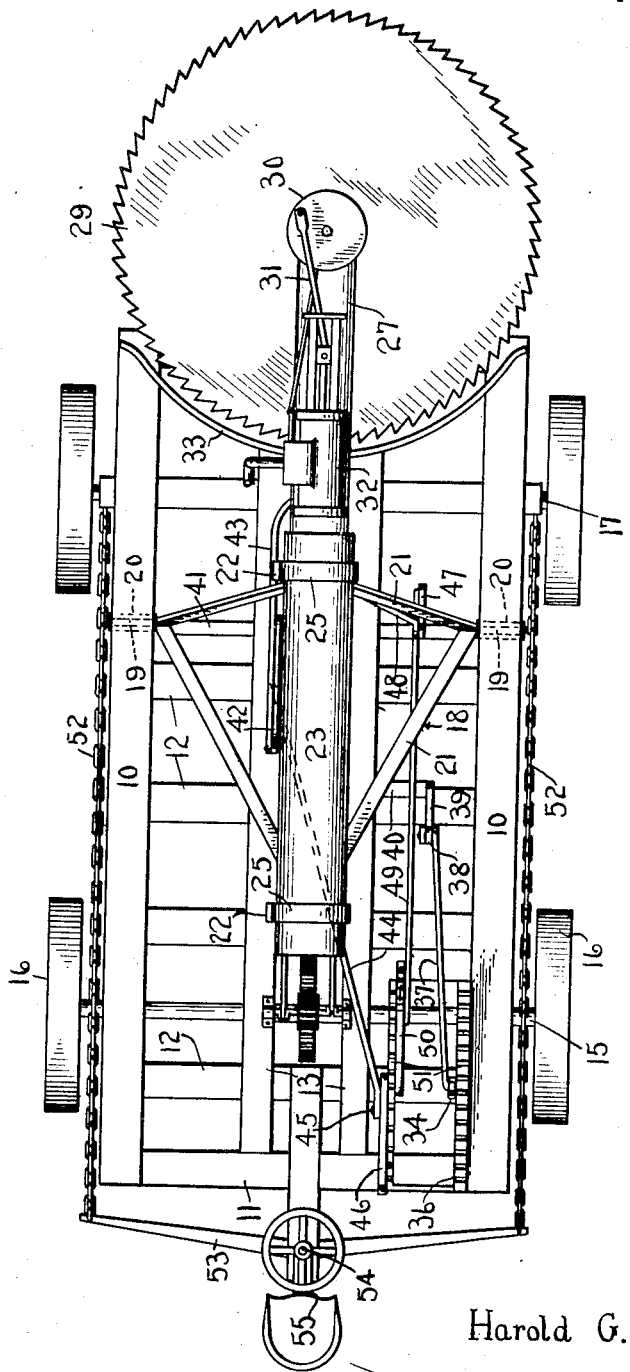
Witnesses
L. B. James
F. G. Smith
Inventor
Harold G. Hoovestol
By Chandlee & Chandlee
Attorneys

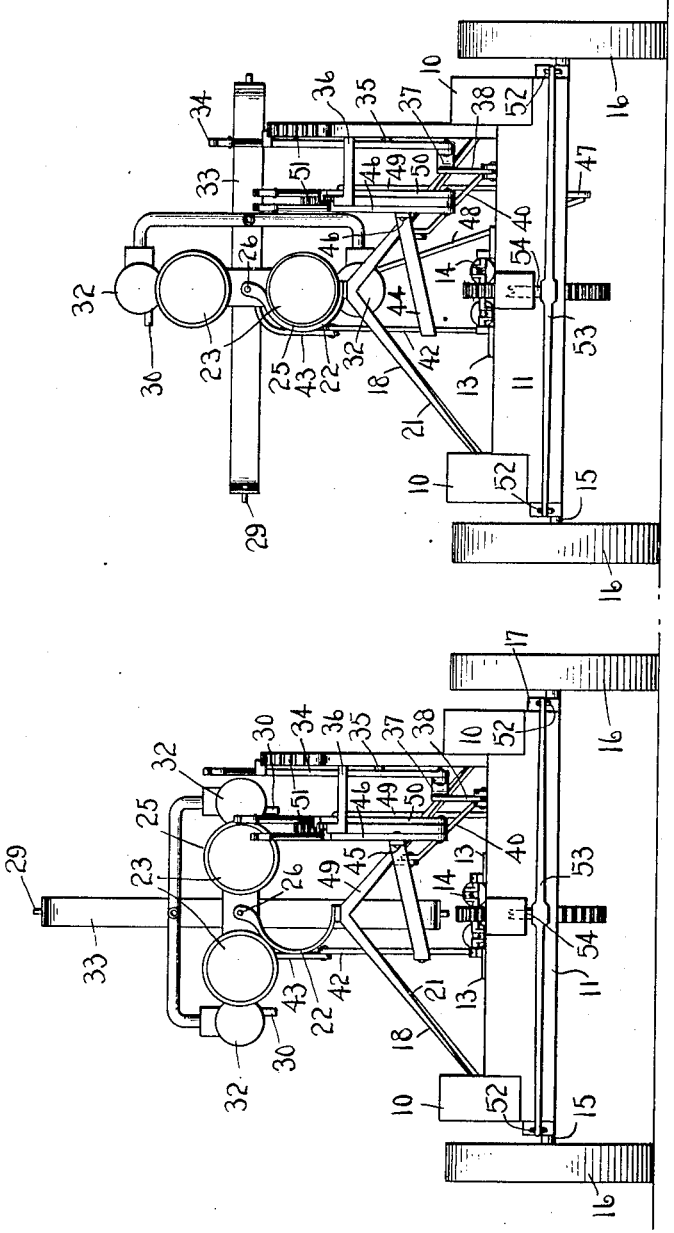

140
UNITED STATES PATENT OFFICE.

HAROLD G. HOOVESTOL, OF BUTLER, ALABAMA.

SAW-TRUCK.

No. 906,714.　　　Specification of Letters Patent.　　Patented Dec. 15, 1908.

Application filed January 17, 1908. Serial No. 411,346.

*To all whom it may concern:*

Be it known that I, HAROLD G. HOOVESTOL, a citizen of the United States, residing at Butler, in the county of Choctaw, State of Alabama, have invented certain new and useful Improvements in Saw-Trucks; and I do hereby declare the following to be a full, clear, and exact description of the invention, such as will enable others skilled in the art to which it appertains to make and use the same.

This invention relates to saw trucks and has for its object to provide a truck of such construction that the saw mounted thereon may be raised or lowered, may be fed forwardly, and may be turned to lie in either a vertical or a horizontal plane or in some intermediate diagonal plane.

In carrying out my invention I employ a frame upon which is supported a pair of hollow cylindrical members, the members being adapted to rock upon the frame. In these members are received telescopically other cylindrical members upon which are supported motors for driving the saw, the saw being supported or hung between the extreme forward ends of the last mentioned cylindrical members. A lever has connection with the frame which supports the hollow cylindrical members whereby the frame may be tilted to raise or lower the saw; a second lever has connection with the last mentioned cylindrical members whereby they may be moved outwardly from the hollow cylindrical members in which they are received, and a third lever has connection with the hollow cylindrical members for rocking them upon their supporting frame so as to bring the saw to horizontal or vertical position or to some intermediate diagonal position according to the character of work to be done.

In the accompanying drawings, Figure 1 is a side elevation of the saw truck, the saw being shown in vertical position, Fig. 2 is a similar view but showing the saw in horizontal position, Fig. 3 is a top plan view the saw being shown in horizontal position, Fig. 4 is a rear elevation of the truck the saw being in vertical position, and, Fig. 5 is a similar view the saw being in horizontal position.

Referring more specifically to the drawings, the truck is shown as comprising a bed frame, including side sills 10 which are connected at their ends by end sills 11, there being also intermediate sills 12 arranged between the end sills. Longitudinal sills 13 extend in parallel relation between the side sills 10 and upon these sills 13 is mounted a suitable engine or motor which is indicated in general by the numeral 14 and which is geared with the rear axle of the machine, indicated by the numeral 15, which axle is of course journaled in bearings beneath the frame and carries wheels 16. An axle 17 is mounted at the front end of the frame and supports the said end thereof.

A rocking frame 18 is provided at its lower corners with laterally projecting stub shafts 19 which are journaled in bearings 20 in the side sills 10 adjacent to the forward end of the frame and this frame includes a pair of inverted V-shaped portions 21 which extend upwardly in diverging planes, it being understood that the stub shafts are located at the point of junction of the arms of the two portions. At the upper end of each portion there is formed an integral upstanding bracket 22 which is curved as clearly shown in the rear elevation in the drawings and the upper end of each of these brackets is located in a common vertical plane with the apex of the frame portion 21 upon which it is formed, the brackets being otherwise located to one side of this vertical plane. The purpose of these brackets will be presently explained.

The numeral 23 denotes a pair of hollow cylindrical members which are connected together by means of cross webs 24 having formed integral therewith collar portions 25. These web portions for connecting the cylindrical members are located practically the same distance apart as are the brackets 22 of the rocking frame and the upper ends of these brackets are pivotally secured as at 26 to the respective web portions 24 at a point mid-way between the cylindrical members. Telescopically received within the cylindrical members 23 are cylindrical members 27 and these members when received at their fullest extent in the members 23, have portions extending considerably therebeyond as shown in the plan and side elevation in the drawings. Rotatably journaled at the extreme forward ends of the cylindrical members 27 is a saw shaft 28 upon which is fixed a circular saw 29. The ends of this shaft 28 project beyond the outer sides of the members 27 and carry crank disks 30 to the crank pins of which are connected the forward ends of connecting rods 31 which are also connected with the pistons of steam engines 32 which engines are supported upon the cylindrical members 27 at the outer sides thereof and may be of any desired form and size. From the foregoing it will be observed that the saw 29 is driven by these engines working in unison. A curved guard 33 is supported by the cylindrical members 27 and between the same and covers the rear edge of the saw.

In order that the frame 18 may be rocked to raise or lower the saw 29, I provide a lever 34 which is pivoted as at 35 in a frame 36 at the rear end of the bed frame of the truck and to this lever is pivotally connected the rear end of a connecting rod 37 which extends forwardly and is connected with one arm 38 of an angle lever. To the other arm 39 of the lever is pivotally connected the lower end of a rod 40 which at its upper end is pivotally connected with one of the arms of the rear portion of the rocking frame. It will be understood from the foregoing that upon rocking the lever, the rocking frame will be tilted so as to raise or lower the saw.

In order to feed the saw forward I have provided a lever mechanism which will now be described. Secured upon the under side of the side sills 10 of the bed frame of the truck and extending transversely of the same is a shaft 41 and connected at its lower end with this shaft for rocking movement is an arm 42 to the upper end of which is pivotally connected the rear end of a rod 43 which rod extends forwardly and is loosely connected preferably by means of a universal joint with the forward web portion 24. Pivoted to the arm 42 adjacent to its lower end is the forward end of a rod 44 which rod extends rearwardly and is pivotally connected as at 45 with a lever 46 also mounted in the frame 36.

It will be observed from the foregoing that by rocking this lever in a forward direction, the cylindrical members 27 between which the saw is hung, will be moved forwardly and that a reverse movement of the lever will retract these members and the saw.

As it is desirable to utilize the saw for the purpose of cutting down trees as well as for sawing through logs, I employ a means for oscillating the telescopic cylindrical members so as to bring the saw either into horizontal or vertical position or into some intermediate diagonal position. This means comprises an angle lever 47 to one arm of which is pivotally connected the lower end of a rod 48. At its upper end this rod has connection by means of a universal joint with the forward one of the collar portions 25 at one side of the frame and to the other arm of the angle lever is connected the forward end of a rod 49, this rod being connected at its rear end to a lever 50 mounted in the frame 36. The lever 50 may be rocked to oscillate the angle lever 47 and this will result in a turning movement of the telescopic cylindrical members from a vertical position to a horizontal one or vice versa, it being understood that when the saw is horizontally disposed, one of the pairs of cylindrical members 23 will be received within the concavities of the brackets 22, the said members 23 being then in a common vertical plane.

For each of the levers 34, 46 and 50 there is provided a rack 51 of the usual construction.

In order that the machine may be moved from place to place the engines 14 are geared with the rear axle 15 and a chain 52 is connected with the front axle 17 adjacent each end thereof and at their rear ends these chains are connected to laterally extending arms 53 carried at the lower end of a vertical steering shaft 54 located directly in advance of a seat 55 at the rear end of the frame, it being understood that the machine may be guided by rotating the said steering shaft.

What is claimed is:

1. A mechanism of the class described, comprising a bed frame, a rocking frame mounted upon the bed frame, telescopic members supported by the rocking frames, a saw shaft journaled between certain of the telescopic members, a circular saw carried by the shaft, motors supported by the telescopic members in which the saw shaft is journaled, the said saw shaft being geared with the motors, and means for rocking the frame to raise and lower the saw.

2. A mechanism of the class described, comprising a bed frame, a rocking frame mounted upon the bed frame, telescopic members supported by the rocking frames, a saw shaft journaled between certain of the telescopic members, a circular saw carried by the shaft, motors supported by the telescopic members in which the saw shaft is journaled, the said saw shaft being geared with the motors, and a lever having connection with the rocking frame, whereby the same may be rocked.

3. A mechanism of the class described, comprising a bed frame, a rocking frame mounted upon the bed frame, telescopic members supported by the rocking frames, a saw shaft journaled between certain of the telescopic members, a circular saw carried by the shaft, motors supported by the telescopic members in which the saw shaft is journaled, the said saw shaft being geared with the motors, means for rocking the frame to raise and lower the saw, and means for moving the telescopic members which carry the saw, to feed the saw forwardly.

4. A mechanism of the class described, comprising a bed frame, a rocking frame mounted upon the bed frame, telescopic members supported by the rocking frames, a saw shaft journaled between certain of the telescopic members, a circular saw carried by the shaft, motors supported by the telescopic members in which the saw shaft is journaled, the said saw shaft being geared with the motors, means for rocking the frame to raise and lower the saw, and means for tilting the telescopic members so as to swing the saw into various planes.

In testimony whereof, I affix my signature, in presence of two witnesses.

HAROLD G. HOOVESTOL.

Witnesses:
F. A. MILLER,
S. A. TURNER.